United States Patent
Kasawa

(10) Patent No.: US 11,305,187 B2
(45) Date of Patent: Apr. 19, 2022

(54) INFORMATION STORAGE MEDIUM AND GAME SYSTEM

(71) Applicant: BANDAI NAMCO ENTERTAINMENT INC., Tokyo (JP)

(72) Inventor: Hiroki Kasawa, Niiza (JP)

(73) Assignee: BANDAI NAMCO ENTERTAINMENT INC., Tokyo (JP)

( * ) Notice: Subject to any disclaimer, the term of this patent is extended or adjusted under 35 U.S.C. 154(b) by 66 days.

(21) Appl. No.: 16/883,672

(22) Filed: May 26, 2020

(65) Prior Publication Data
US 2020/0368613 A1 Nov. 26, 2020

(30) Foreign Application Priority Data
May 23, 2019 (JP) .............................. JP2019-096729

(51) Int. Cl.
*A63F 13/352* (2014.01)
*A63F 13/50* (2014.01)
(Continued)

(52) U.S. Cl.
CPC ............ *A63F 13/352* (2014.09); *A63F 13/50* (2014.09); *A63F 13/77* (2014.09); *A63F 13/79* (2014.09)

(58) Field of Classification Search
CPC ........ A63F 13/352; A63F 13/50; A63F 13/79; A63F 13/77; A63F 13/533; A63F 13/35
(Continued)

(56) References Cited

U.S. PATENT DOCUMENTS

| 2014/0121026 A1* | 5/2014 | Hashimoto | ............. A63F 13/69 463/42 |
| 2014/0235354 A1* | 8/2014 | Takeuchi | ............ G07F 17/3225 463/42 |

(Continued)

FOREIGN PATENT DOCUMENTS

| JP | 6312875 B1 | 4/2018 |
| JP | 2018-118091 A | 8/2018 |

OTHER PUBLICATIONS

Duels X Machina Now [online]. "Must-see card game beginners! Explain the basic flow and basic rules of battle!" https://duelsx.g.boom-app.com/entry/duelsx-basic-rules, Mar. 31, 2017.
(Continued)

*Primary Examiner* — Michael A Cuff
(74) *Attorney, Agent, or Firm* — Oliff PLC

(57) ABSTRACT

A game system reduces a compensation parameter by a consumption amount set for a game medium and sets the medium to be useable, increases the parameter to up to an upper limit of a predetermined value when a predetermined increase condition is satisfied, stores a normal game medium in which the set consumption amount is equal to or less than the value, and a special game medium in which the set consumption amount is more than the value in a storage unit as the medium in association with a player, reduces the parameter by a given reduction amount and increases an accumulated parameter in accordance with the reduction amount, and sets the special medium to be useable by reducing the compensation and/or accumulated parameters so that a sum of reduction amounts of the compensation and accumulated parameters together is equal to the consumption amount set for the special medium.

13 Claims, 14 Drawing Sheets

(51) Int. Cl.
*A63F 13/79* (2014.01)
*A63F 13/77* (2014.01)

(58) Field of Classification Search
USPC .......................................................... 463/42
See application file for complete search history.

(56) References Cited

U.S. PATENT DOCUMENTS

| | | | | |
|---|---|---|---|---|
| 2014/0274401 A1* | 9/2014 | Oono | ................... | A63F 13/798 463/40 |
| 2014/0289324 A1* | 9/2014 | Umehara | .............. | A63F 13/795 709/203 |
| 2015/0050986 A1* | 2/2015 | Fujimoto | ................ | A63F 13/58 463/23 |
| 2015/0094141 A1* | 4/2015 | Shiratori | ............... | A63F 13/822 463/30 |
| 2015/0182864 A1* | 7/2015 | Wada | ................... | A63F 13/822 463/9 |
| 2017/0239575 A1* | 8/2017 | Tanabe | ................... | A63F 13/80 |
| 2019/0143217 A1* | 5/2019 | Yoneyama | .............. | A63F 13/47 463/42 |
| 2020/0023264 A1* | 1/2020 | Chardon | ................... | A63F 1/04 |
| 2020/0078686 A1* | 3/2020 | Morishita | ............... | A63F 13/95 |
| 2020/0094134 A1* | 3/2020 | Marchesi | ............. | A63F 13/213 |
| 2020/0391100 A1* | 12/2020 | Fujimoto | ............... | G06K 19/07 |
| 2021/0001231 A1* | 1/2021 | Kurabayashi | .......... | G06N 99/00 |

OTHER PUBLICATIONS

Duels X Machina Now [online]. "How to fight at Trinity. Grab a victory with a battle style that deploys powerful units before your opponent!" https://duelsx.g.boom-app.com/entry/duelsx-trinity, Jun. 16, 2017.

Duels X Machina Now [online]. "[Revolution compatible] Introducing the Trinity card, which features of mana acceleration! Carefully select cards that can be expected to be successful in the ladder for each expansion." https://duelsx.g.boom-app.com/entry/duelsx-trinity-card, Mar. 23, 2018.

* cited by examiner

INFORMATION STORAGE MEDIUM AND GAME SYSTEM

Japanese Patent Application No. 2019-096729, filed on May 23, 2019, is hereby incorporated by reference in its entirety.

BACKGROUND OF THE INVENTION

The present invention relates to an information storage medium and a game system.

Hitherto, a game in which a card selected from a plurality of cards (game media) in the hand is placed in a useable state by consuming energy that automatically recovers in accordance with elapse of time has been known (for example, JP-A-2018-118091). In general, in a game as above, the energy needed to obtain the useable state is set for each game medium, and more energy is needed for a stronger game media. Therefore, a player plays game while selecting whether to place a strong game medium in the useable state by consuming a large amount of energy or to place a plurality of weak game media in the useable state by consuming a small amount of energy a plurality of times in accordance with the progress of a battle.

However, in the game of the related art, any game medium can be placed in the useable state within the range of an upper limit value of the energy that automatically recovers. In other words, the energy recovers to the upper limit value as long as time elapses, and anyone can eventually use a strong game medium. As a result, whether a good game medium is included in the hand greatly contributes to the outcome of the battle, and there has been a lack of strategy regarding the way of using the energy.

SUMMARY

The invention is capable of providing an information storage medium and a game system capable of enhancing amusement properties of a game using a game media to be placed in a useable state by consuming a compensation parameter.

According to a first aspect of the invention, there is provided a non-transitory computer-readable information storage medium storing a program for causing a game to progress by reducing a compensation parameter by a consumption amount set for a game medium and setting the game medium to be in a useable state, the program causing a computer to function as:

a compensation parameter management unit that increases the compensation parameter to up to an upper limit of a predetermined value when a predetermined increase condition is satisfied;

a storage control unit that stores a normal game medium in which the set consumption amount is equal to or less than the predetermined value, and a special game medium in which the set consumption amount is more than the predetermined value in a storage unit as the game medium in association with a player;

an accumulated parameter management unit that reduces the compensation parameter by a given reduction amount and increases an accumulated parameter in accordance with the reduction amount; and a useable state setting unit that sets the special game medium to be in the useable state by reducing the compensation parameter and/or the accumulated parameter so that a sum of a reduction amount of the compensation parameter and a reduction amount of the accumulated parameter together is equal to the consumption amount set for the special game medium.

According to a second aspect of the invention, there is provided a game system for causing a game to progress by reducing a compensation parameter by a consumption amount set for a game medium and setting the game medium to be in a useable state, the game system including:

a compensation parameter management unit that increases the compensation parameter to up to an upper limit of a predetermined value when a predetermined increase condition is satisfied;

a storage control unit that stores a normal game medium in which the set consumption amount is equal to or less than the predetermined value, and a special game medium in which the set consumption amount is more than the predetermined value in a storage unit as the game medium in association with a player;

an accumulated parameter management unit that reduces the compensation parameter by a given reduction amount and increases an accumulated parameter in accordance with the reduction amount; and a useable state setting unit that sets the special game medium to be in the useable state by reducing the compensation parameter and/or the accumulated parameter so that a sum of a reduction amount of the compensation parameter and a reduction amount of the accumulated parameter together is equal to the consumption amount set for the special game medium.

Figure 1:
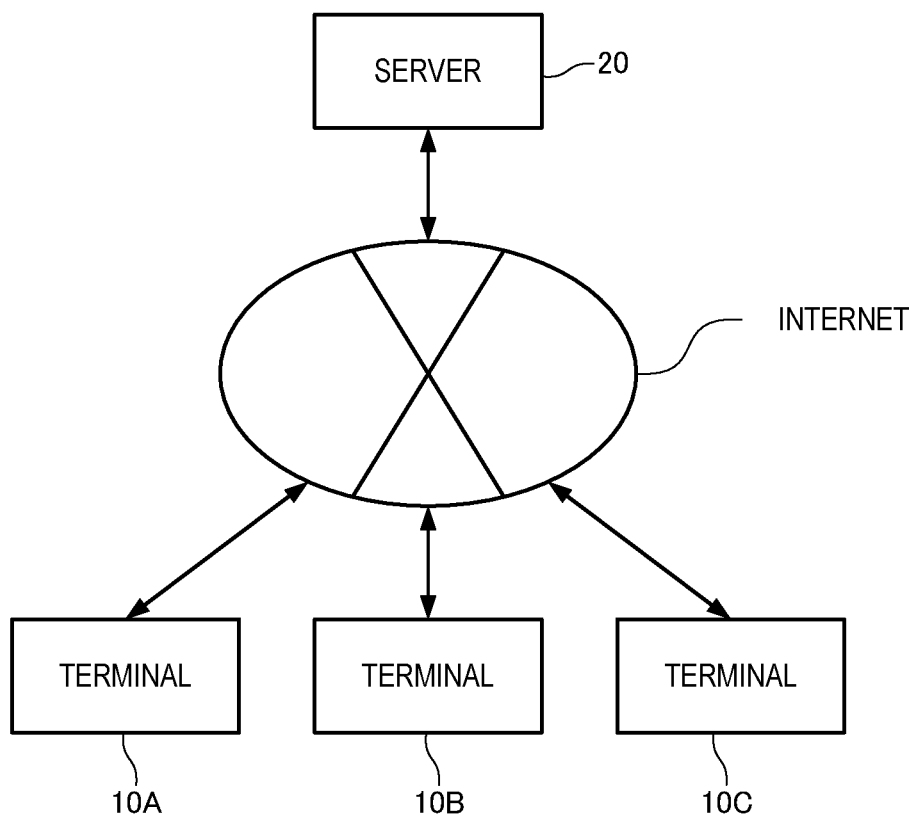
FIG. 1 illustrates a game system according to one embodiment of the invention.

DETAILED DESCRIPTION OF THE EMBODIMENT (1) According to one embodiment of the invention, there is provided a non-transitory computer-readable information storage medium storing a program for causing a game to progress by reducing a compensation parameter by a consumption amount set for a game medium and setting the game medium to be in a useable state, the program causing a computer to function as:

a compensation parameter management unit that increases the compensation parameter to up to an upper limit of a predetermined value when a predetermined increase condition is satisfied;

a storage control unit that stores a normal game medium in which the set consumption amount is equal to or less than the predetermined value, and a special game medium in which the set consumption amount is more than the predetermined value in a storage unit as the game medium in association with a player;

an accumulated parameter management unit that reduces the compensation parameter by a given reduction amount and increases an accumulated parameter in accordance with the reduction amount; and a useable state setting unit that sets the special game medium to be in the useable state by reducing the compensation parameter and/or the accumulated parameter so that a sum of a reduction amount of the compensation parameter and a reduction amount of the accumulated parameter together is equal to the consumption amount set for the special game medium.

According to one embodiment of the invention, there is provided a game system including the abovementioned units.

According to the abovementioned embodiment, the normal game medium can be placed in the useable state within the range of the upper limit (predetermined value) of the compensation parameter, and the special game medium of which consumption amount is higher than the upper limit of the compensation parameter can be placed in the useable state by reducing the compensation parameter, increasing the accumulated parameter, and consuming the compensation parameter and the accumulated parameter. As a result, the amusement properties of the game using the game media can be enhanced.

(2) In the information storage medium and the game system, the compensation parameter management unit may increase the compensation parameter to up to an upper limit of a predetermined value in accordance with elapse of time.

According to the information storage medium and the game system described above, the normal game medium can be placed in the useable state within the range of the upper limit (predetermined value) of the compensation parameter that automatically recovers in accordance with the elapse of time. The special game medium of which consumption amount is higher than the upper limit of the compensation parameter can be placed in the useable state by reducing the compensation parameter, increasing the accumulated parameter, and reducing the compensation parameter and the accumulated parameter. As a result, the amusement properties of the game using the game media can be enhanced.

(3) In the information storage medium and the game system described above, the accumulated parameter management unit may reduce the compensation parameter by a given reduction amount when a given accumulation condition is satisfied, and increase the accumulated parameter in accordance with the reduction amount.

According to the information storage medium and the game system described above, the amusement properties of the game using the game media can be enhanced by reducing the compensation parameter and increasing the accumulated parameter when the given accumulation condition is satisfied.

(4) In the information storage medium and the game system described above, the accumulated parameter management unit may reduce the compensation parameter by a given reduction amount when a game situation in a period for accepting an operation for setting the game medium to be in the useable state and an operation for causing the game medium set to be in the useable state to act satisfies a given accumulation condition, and increase the accumulated parameter in accordance with the reduction amount.

According to the information storage medium and the game system described above, the amusement properties of the game using the game media can be enhanced by reducing the compensation parameter and increasing the accumulated parameter when the game situation in the period in which the game medium is placed in the useable state or the game medium in the useable state is caused to take action satisfies the accumulation condition.

(5) In the information storage medium and the game system described above, the accumulated parameter management unit may determine that the accumulation condition is satisfied when the compensation parameter remains in the period for accepting the operation for setting the game medium to be in the useable state and the operation for causing the game medium set to be in the useable state to act, reduce the compensation parameter by a given reduction amount, and increase the accumulated parameter in accordance with the reduction amount.

According to the information storage medium and the game system described above, the amusement properties of the game using the game media can be enhanced by reducing the compensation parameter and increasing the accumulated parameter when the compensation parameter is remaining in the period in which the game medium is placed in the useable state or the game medium in the useable state is caused to take action.

(6) In the information storage medium and the game system described above, the accumulated parameter management unit may reduce the compensation parameter by a given reduction amount at a time point at which a period for accepting an operation for setting the game medium to be in the useable state and an operation for causing the game medium set to be in the useable state to act ends, and increase the accumulated parameter in accordance with the reduction amount.

According to the information storage medium and the game system described above, the amusement properties of the game using the game media can be enhanced by reducing the compensation parameter and increasing the accumulated parameter at the time point at which the period in which the game medium is placed in the useable state or the game medium in the useable state is caused to take action ends.

(7) In the information storage medium and the game system described above, the accumulated parameter management unit may change an upper limit value of the accumulated parameter when a given total amount change condition is satisfied.

According to the information storage medium and the game system described above, the amusement properties of the game using the game media can be enhanced by changing the upper limit value of the accumulated parameter when the given total amount change condition is satisfied.

(8) In the information storage medium and the game system described above, the accumulated parameter management unit may change an increase amount of the accumulated parameter to be increased when the compensation parameter is reduced, when a given accumulated amount change condition is satisfied.

According to the information storage medium and the game system described above, the amusement properties of the game using the game media can be enhanced by changing the increase amount of the accumulated parameter when the compensation parameter is reduced when the given accumulated amount change condition is satisfied.

(9) In the information storage medium and the game system described above, the useable state setting unit may set the special game medium to be in the useable state by reducing the accumulated parameter when a given consumption condition is satisfied.

According to the information storage medium and the game system described above, the amusement properties of the game using the game media can be enhanced by placing the special game medium to be in the useable state by reducing the accumulated parameter when the given consumption condition is satisfied.

(10) In the information storage medium and the game system described above, the useable state setting unit may cause the accumulated parameter to be zero regardless of the consumption amount set for the special game medium, when the special game medium is set to be in the useable state by reducing the accumulated parameter.

According to the information storage medium and the game system described above, the amusement properties of the game using the game media can be enhanced by causing the accumulated parameter to be zero regardless of the consumption amount when the special game medium is placed in the useable state by reducing the accumulated parameter.

(11) In the information storage medium, the program may further cause the computer to function as:

a display control unit that displays information on a difference between the consumption amount set for the special game medium owned by the player and an amount obtained by adding an amount of the compensation parameter and an amount of the accumulated parameter together on a display unit.

The game system may further include a display control unit that displays information on a difference between the consumption amount set for the special game medium owned by the player and an amount obtained by adding an amount of the compensation parameter and an amount of the accumulated parameter together on a display unit.

(12) In the information storage medium and the game system described above, the accumulated parameter management unit may prevent the accumulated parameter from being increased after setting the special game medium to be in the useable state by reducing the accumulated parameter a predetermined number of times.

According to the information storage medium and the game system described above, the amusement properties of the game using the game media can be enhanced by preventing the accumulated parameter from increasing after causing the special game medium to be in the useable state by reducing the accumulated parameter a predetermined number of times.

Embodiments of the invention are described below. Note that the following embodiments do not unduly limit the scope of the invention as stated in the claims. Not all elements described in the following embodiments are necessarily essential requirements of the invention.

1. Configuration

FIG. 1 illustrates a game system according to one embodiment of the invention. In this embodiment, the game system includes a plurality of terminals 10 and a server 20 (server system). In other words, as illustrated in FIG. 1, in the game system of this embodiment, the server 20 that provides a service and the terminals 10 (10A, 10B, 10C . . . ) are configured to be connectable to a network.

The server 20 is an information processing apparatus that provides an online gaming service in accordance with requests from the terminals 10. The server 20 can include one or a plurality of servers (an authentication server, a matching server, a game processing server, a communication server, a billing server, a database server, and the like).

In this embodiment, a game program is executed on each of the terminals 10. In the server 20, account information of a player, and information on the gaming result of the game executed on the terminal 10, a game medium (a virtual card indicating a character, an item, and the like) usable in the game, currency usable in the game, and the like are managed.

The terminals 10 are information processing apparatuses such as a mobile terminal (a smartphone, a mobile phone, a mobile gaming machine, and the like), a personal computer (PC), a game apparatus, and an image generation apparatus, and is an apparatus connectable to the server 20 via networks such as the internet (WAN) and a LAN. The communication line between the terminals 10 and the server 20 may be wired or wireless.

Figure 2:
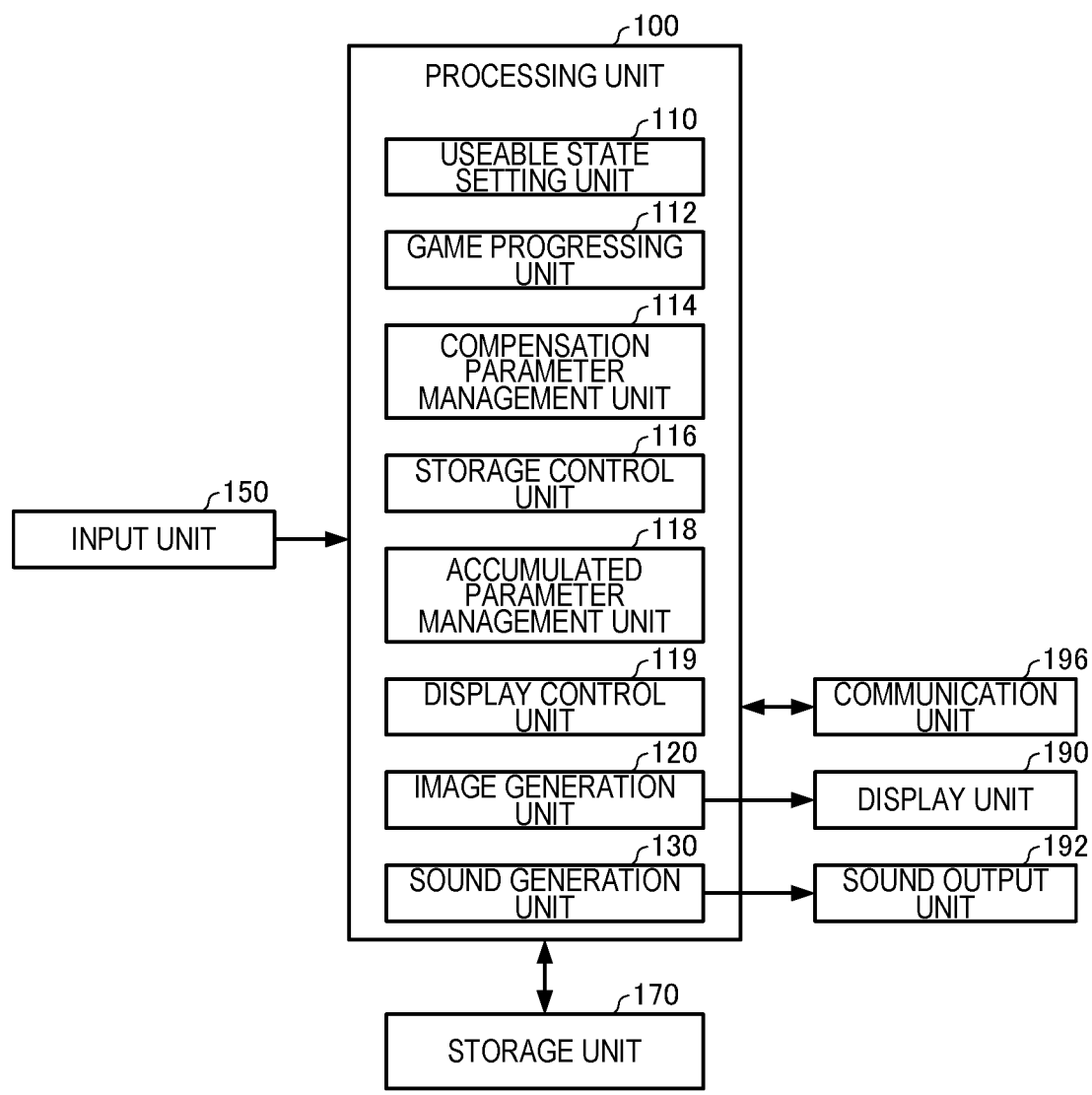
FIG. 2 illustrates an example of a functional block diagram of a terminal according to one embodiment of the invention.

FIG. 2 illustrates an example of a functional block diagram of the terminal 10 of this embodiment. The game apparatus of this embodiment may have a configuration in which some of the configuration elements (units) in FIG. 2 are omitted.

An input unit 150 is a device for inputting (detecting) information input from the player, and outputs information (operation input) input by the player to a processing unit 100. The function of the input unit 150 can be implemented by an input device such as a touch screen, a touchpad, a mouse, arrow keys, buttons, and a keyboard.

A storage unit 170 stores various data and programs for causing a computer to function as the units of the processing unit 100 therein, and functions as a work area of the processing unit 100. The functions can be implemented by a hard disk drive, a RAM, and the like.

A display unit 190 outputs a game image generated by the processing unit 100, and the function thereof can be implemented by a display such as a touch screen, an LCD, and a head mounted display (HMD) that also function as the input unit 150.

A sound output unit 192 outputs the sound generated by the processing unit 100, and the function thereof can be implemented by a speaker, a headphone, or the like.

A communication unit 196 performs various controls for performing communication with the server 20 and other terminals 10, and the function thereof can be implemented by hardware such as various processors or an ASIC for communication, a program, or the like.

The programs and various data for causing the computer to function as the units of the processing unit 100 stored in the information storage medium and the storage unit included in the server 20 may be received via the network, and the received programs and data may be stored in the storage unit 170. A case where the terminal is caused to function by receiving programs and various data as above is also within the gist of the invention.

The processing unit 100 (processor) performs processing such as game processing, image generating processing, and sound generating processing based on the input information (operation information) from the input unit 150, programs, data received via the communication unit 196, and the like. The function of the processing unit 100 can be implemented by hardware such as various processors (a CPU, a DSP, and the like) and an ASIC (a gate array or the like), and programs. The processing unit 100 includes a useable state setting unit 110, a game progressing unit 112, a compensation parameter management unit 114, a storage control unit 116, an accumulated parameter management unit 118, an image generation unit 120, and a sound generation unit 130.

The useable state setting unit 110 reduces a compensation parameter by a consumption amount set for the game medium based on the operation of the player, and sets the game medium to be in a useable state. Game media that can be set to be in the useable state may be selected (added to the hand) from the game media (stack) included in the deck of the player, and a game medium selected by the operation of the player out of the game media selected to be settable to be in the useable state may be set to be in the useable state (place the selected hand on the table). The battle may be started after causing the plurality of game media to be settable to be in the useable state in advance. All of the game media included in the deck of the player may be settable to be in the useable state in advance. The invention is not limited to a case where the game is played after setting the deck in advance, and all of the game media owned by the player may be settable to be in the useable state. When the deck is to be set, the number of the game media that can be included in the deck may or may not be limited. Rarity degrees may be set for the game media, and the number that can be included in the deck may be specified for each rarity degree. A restriction in which the deck needs to be set such that the total value or the average value of parameters (the attack force and the like) set for the game media included in the deck is within a predetermined value may be provided.

The game progressing unit 112 causes a battle game to progress based on parameters (for example, the attack force and the health point value) of the game medium set to be in the useable state. In more detail, the game progressing unit 112 repeats reducing the health point value set for the opponent (or the health point value set for the game medium of the opponent) based on the attack force set for the game medium of the player, and reducing the health point value set for the player (or the health point value set for the game medium of the player) based on the attack force set for the game medium of the opponent. The player wins when the health point value of the opponent becomes 0, and the opponent wins when the health point value of the player becomes 0. The battle may be performed over a network (online battle), or may be performed not over a network (offline battle). The players may battle with each other, or the player and a computer may battle with each other (computer battle). The battle game is not limited to a game in which the health point value of the opponent becomes 0 by an attack using the game medium. For example, the player may win when a predetermined number of opponent game media is defeated (the health point value of a predetermined number of game media becomes 0), or the player may win when the number of the game media included in the deck of the opponent (forming the deck) becomes equal to or less than a predetermined number (for example, 0). The player may win when the opponent gives up. The battle result may be a tie. The battle may be a turn-based battle in which the player and the opponent take action in turn or may not be a turn-based battle. For example, the player may be able to take action after a predetermined amount of time has elapsed. The game is not limited to a game in which turns are alternately taken, and it may be randomly specified whether the player can take action or the opponent can take action (whether it is the turn of the player or it is the turn of the opponent). In other words, in the battle in this embodiment, a period (a period in which an operation for setting the game medium to be in the useable state and an operation for causing the game medium set to be in the useable state to take action are accepted, hereinafter also referred to as an "actable period") in which the player can take action only needs to exist.

The compensation parameter management unit 114 increases the compensation parameter to up to an upper limit of a predetermined value when a predetermined increase condition is satisfied. For example, the compensation parameter management unit 114 may increase the compensation parameter to up to an upper limit of a predetermined value in accordance with the elapse of time. The elapse of time may be the elapse of actual time. Alternatively, the elapse of time may be the elapse of turns (the number of elapsed turns) for a turn-based battle. The elapse of actual time may be the elapse of time from the start of the battle (the start of the battle is set as a starting point), the elapse of time from the start of the turn, the elapse of time from a time point at which a predetermined item is used, the elapse of time from a time point at which the game medium is placed in the useable state, or the elapse of time from a time point at which the special effect of the game medium is activated. When the compensation parameter is increased in accordance with the elapse of turns, the compensation parameter may be increased to a predetermined value (fully recovered) each time a turn starts, or the compensation parameter may be increased by a predetermined amount each time the turn starts (for example, when the predetermined value is 10, the compensation parameter may be increased by 2 each time the turn starts, and the compensation parameter may reach the predetermined value by five turns). The compensation parameter may be increased by predetermined amounts in accordance with the elapse of actual time from the start of the turn. The compensation parameter may be increased in the turn of the player (self) or may be increased in the turn of the opponent. The compensation parameter may be increased every time the turn starts (every turn), or may be increased every two turns, for example. The compensation parameter may be increased when a predetermined item is used, a special effect of the game medium is activated, the game medium of the opponent is defeated, or the health point value of the opponent is reduced, for example, regardless of the elapse of time. The predetermined value may be a fixed value or a variable value. For example, the predetermined value may be increased by predetermined amounts in accordance with elapse of time (turns, actual time). However, the predetermined value is prevented from being higher than the consumption amount of a special game medium described below also in this case. The predetermined value may be a common value regardless of the player, or may be different for each player. For example, the predetermined value (upper limit) of the compensation parameter of the player may be specified in accordance with the player level of the player, and the predetermined value may become larger as the player level becomes higher. The amount (the increase amount per unit time) by which the predetermined value increases may be different for each player. For example, the predetermined value may increase faster as the player level becomes higher.

The storage control unit 116 stores a normal game medium (a game medium of which set consumption amount is equal to or less than a predetermined value) and a special game medium (the set consumption amount is higher than the predetermined value) in the storage unit 170 as the game media in association with the player. The game medium may be obtained by the player by consuming in-game currency, given to the player in accordance with the progress of the game, able to be handed over or exchanged among the players, or able to be obtained by a lottery with use of a gacha system and the like. When the predetermined value (upper limit) of the compensation parameter differs for each player, a game medium for which a consumption amount higher than the predetermined value of the player is set may be the special game medium for the player, and a game medium for which a consumption amount equal to or less than the predetermined value of the player is set may be the normal game medium for the player. A game medium for which a consumption amount that is higher than each of the predetermined values (for example, the predetermined value when the player level is the maximum level when the predetermined value increases as the player level increases) of all players is set may be the special game medium.

When a given accumulation condition is satisfied, the accumulated parameter management unit 118 increases the accumulated parameter in accordance with a given reduction amount by reducing the compensation parameter by the reduction amount. The accumulated parameter management unit 118 may determine whether the game situation in a player actable period satisfies the accumulation condition. The accumulated parameter management unit 118 may increase the accumulated parameter in accordance with the reduction amount of the compensation parameter by reducing the compensation parameter (for example, reducing the remaining compensation parameter to 0) at an ending time point of the player actable period. The accumulated parameter management unit 118 may change the upper limit value of the accumulated parameter when the given total amount change condition is satisfied, and may change the increase amount of the accumulated parameter when the compensation parameter is reduced when the given accumulated amount change condition is satisfied.

The useable state setting unit 110 sets the special game medium to be in the useable state by reducing the compensation parameter and/or the accumulated parameter so that the value obtained by adding the reduction amount of the compensation parameter and the reduction amount of the accumulated parameter together is equal to the consumption amount set for the special game medium. The useable state setting unit 110 may set the special game medium to be in the useable state by reducing the accumulated parameter when the given consumption condition is satisfied. The useable state setting unit 110 may cause the accumulated parameter to become 0 regardless of the consumption amount set for the special game medium when the special game medium is set to be in the useable state by reducing the accumulated parameter. In this case, a display control unit 119 included in the processing unit 100 may display information (the value of the difference, the consumption amount, the added amount, and notification indicating that the difference is large) on the difference between the consumption amount set for the special game medium owned by the player, and an amount obtained by adding the amount of the compensation parameter and the amount of the accumulated parameter together on the display unit 190 (game screen). The accumulated parameter management unit 118 may prevent the accumulated parameter from increasing after setting the special game medium to be in the useable state by reducing the accumulated parameter by the useable state setting unit 110 a predetermined number of times.

The image generation unit 120 generates a game image by performing rendering processing based on the results of various processing performed by the processing unit 100, and outputs game image to the display unit 190. The image generation unit 120 generates an image (so-called three-dimensional image) seen from a virtual camera (given point of view) in an object space (game space).

The sound generation unit 130 generates game sounds such as BGM, sound effects, or voices by performing sound processing based on the results of various processing performed by the processing unit 100, and outputs the game sounds to the sound output unit 192.

The processing unit 100 transmits information for providing notification indicating that the game has started to the server 20 when the game starts, and transmits gaming result information relating to the gaming result and various game parameters to the server 20 when the game ends. The server 20 performs updating processing of various data associated with the players based on the gaming result information transmitted from the game apparatuses (terminals 10).

The game system of this embodiment may be formed as a server system. The server system can include one or a plurality of servers (an authentication server, a game processing server, a communication server, a billing server, a database server, and the like). In this case, the server system generates data for image generation for generating an image by performing the processing of the units of the processing unit 100 (the useable state setting unit 110, the game progressing unit 112, the compensation parameter management unit 114, the storage control unit 116, and the accumulated parameter management unit 118) based on the operation inputs (the data input to the input unit of the terminal) transmitted from one or a plurality of terminals (for example, a smartphone, a mobile phone, or a mobile gaming machine) connected over a network, and transmits the generated data for image generation to the terminals. The data for image generation is data for displaying the image generated by the method of this embodiment on the terminals, and may be the image data itself or may be various data (object data, game processing result data, and the like) used by the terminal to generate the image. The game system may be formed such that the processing of the units of the processing unit 100 is executed by being dispersed between the server and the terminal. It is possible to implement the invention with only the terminal (a game apparatus, a PC, a smartphone, or the like) and without using the server (offline). The invention can be applied to a game app executed on a smartphone, a software game for a consumer gaming machine, a software game for a PC, a browser game for a smartphone or a PC, an arcade gaming machine, and the like.

2. Method

Next, a method according to one embodiment of the invention is described with reference to the drawings. The game system of this embodiment is formed so as to place the game medium in the useable state by reducing the compensation parameter by the consumption amount set for the game medium, and execute the game that causes the battle to progress with use of the game medium in the useable state.

Figure 3:
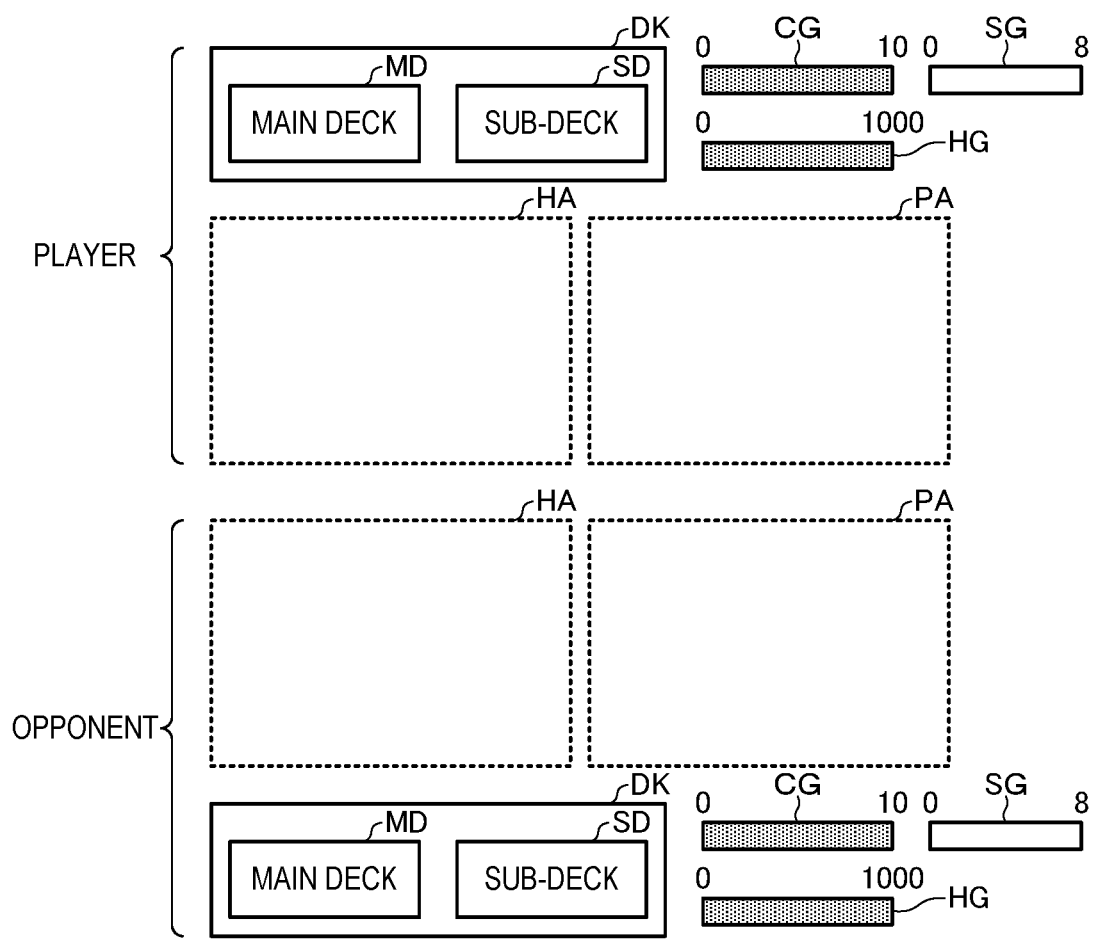
FIG. 3 is a schematic diagram for describing an outline of a battle game executed in one embodiment of the invention.

FIG. 3 is a schematic diagram for describing an outline of a battle game executed in this embodiment. The player sets a deck DK (stack) formed by the plurality of game media (cards indicating characters and special effects) before the battle game starts. The deck DK includes a main deck MD formed by 25 normal game media, for example, and a sub-deck SD formed by five special game media, for example. The player selects 25 normal game media from the game media owned by the player and sets the selected normal game media to the main deck MD. The player selects five special game media from the game media and sets the selected special game media to the sub-deck SD. The deck DK does not necessarily need to be separated to the main deck MD and the sub-deck SD, and the normal game media and the special game media may be mixed in one deck DK.

The compensation parameter and the accumulated parameter are set for the player. The compensation parameter is shown by a gauge CG and the accumulated parameter is shown by a gauge SG. The compensation parameter is reduced by a cost (consumption amount) set for the game medium each time the player places the game medium in the useable state, and is recovered to a predetermined value set as the upper limit of the compensation parameter every turn. The predetermined value of the compensation parameter is "10" here. The accumulated parameter is increased by the reduction amount of the compensation parameter by reducing the compensation parameter. An upper limit value is set for the accumulated parameter, and the upper limit value of the accumulated parameter is "8" here. Out of the game media, a cost equal to or less than a predetermined value of the compensation parameter is set for the normal game medium, and a cost (cost equal to or less than a value obtained by adding the predetermined value and the upper limit value together) larger than the predetermined value is set for the special game medium. Therefore, even when the compensation parameter fully recovers, the special game medium cannot be placed in the useable state only by consuming the compensation parameter.

A health point value (hit points) is set for the player. The health point value is shown by a gauge HG. The health point value is reduced by a value of the attack force set for the game medium each time an attack is received by the game medium of the opponent. The upper limit of the health point value is "1000" here. In FIG. 3, a hand area HA in which a game medium selected as the hand from the deck DK is disposed, and a layout area PA in which a game medium selected from the hand as the layout (placed in the useable state) is disposed are illustrated. The description above also applies to the opponent.

Figure 4:
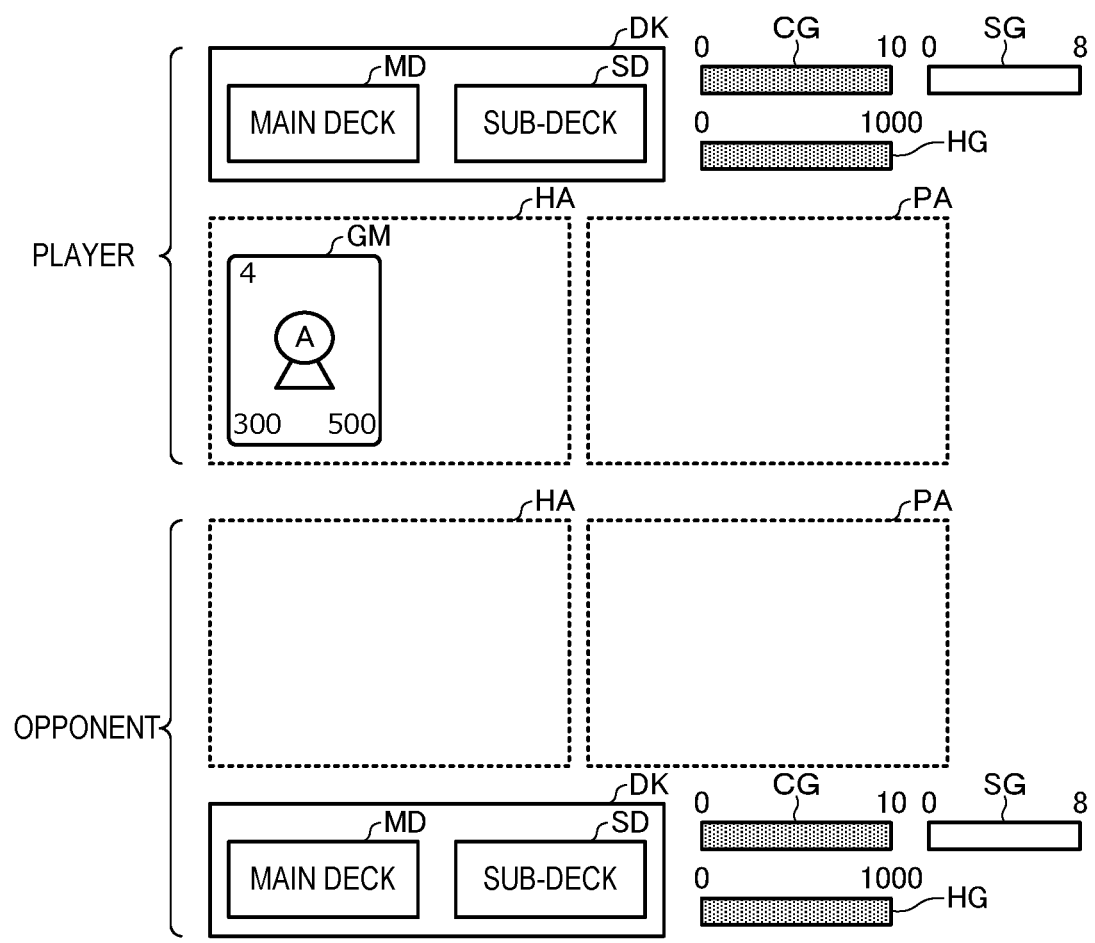
FIG. 4 is a schematic diagram for describing an outline of a battle game executed in one embodiment of the invention.
Figure 5:
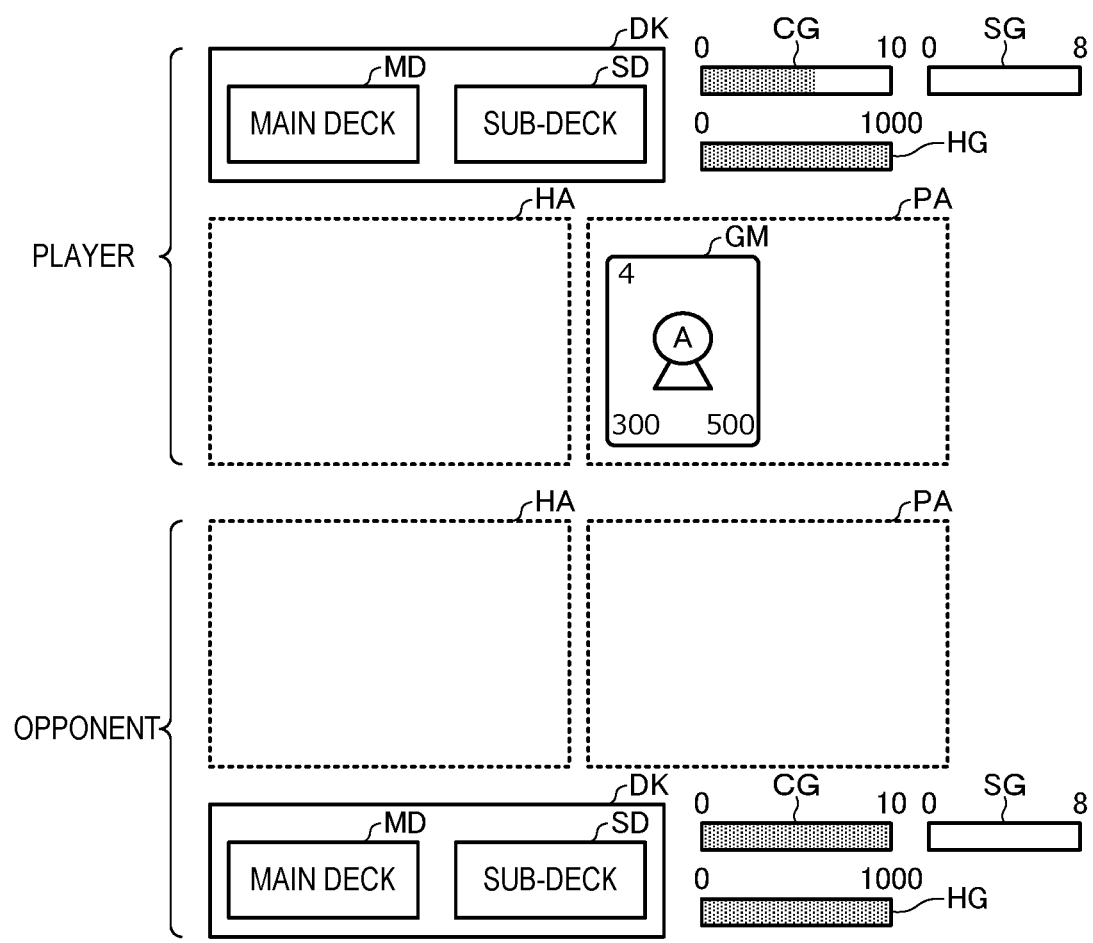
FIG. 5 is a schematic diagram for describing an outline of a battle game executed in one embodiment of the invention.

Next, one example of the flow of the battle game is described. A case where the battle game is started from the player first (from the turn of the player) is described here as an example. At the start of the game, the compensation parameter is "10", which is a predetermined value, and the accumulated parameter is "0". The health point value is "1000", which is the upper limit. When the game starts, one game medium is selected as the hand from the game media (stack) included in the deck DK (the main deck MD and the sub-deck SD) of the player by lottery (randomly), for example. In the example illustrated in FIG. 4, a game medium GM indicating a character "A" is selected as the hand from the deck DK of the player, and is disposed in the hand area HA of the player. In the game medium GM indicating a character, the cost (upper-left number), the attack force (lower-left number), and the health point value (lower-right number) are set. In the game medium GM of the character "A" illustrated in FIG. 4, the cost is set to "4", the attack force is set to "300", and the health point value is set to "500". The cost "4" of the game medium GM is equal to or less than the predetermined value "10", and hence the game medium GM is a normal game medium. The player may end the turn of the player here, or can consume the compensation parameter and place the game medium GM in the hand on the table (place the game medium GM in the hand in the useable state). In the example illustrated in FIG. 5, the game medium GM of the character "A" is placed on the table and is disposed in the layout area PA of the player. The compensation parameter of the player is reduced by the cost "4" of the game medium GM in the useable state, and becomes "6" here. The game medium GM in the useable state cannot be caused to take action until the next turn. No game medium is placed in the hand area HA of the player, and hence the player ends the turn of the player (an operation for ending the turn is performed or the turn automatically ends). The game medium GM in the useable state may be enabled to take action without waiting for the next turn (the turn in which the game medium GM is placed in the useable state).

Figure 6:
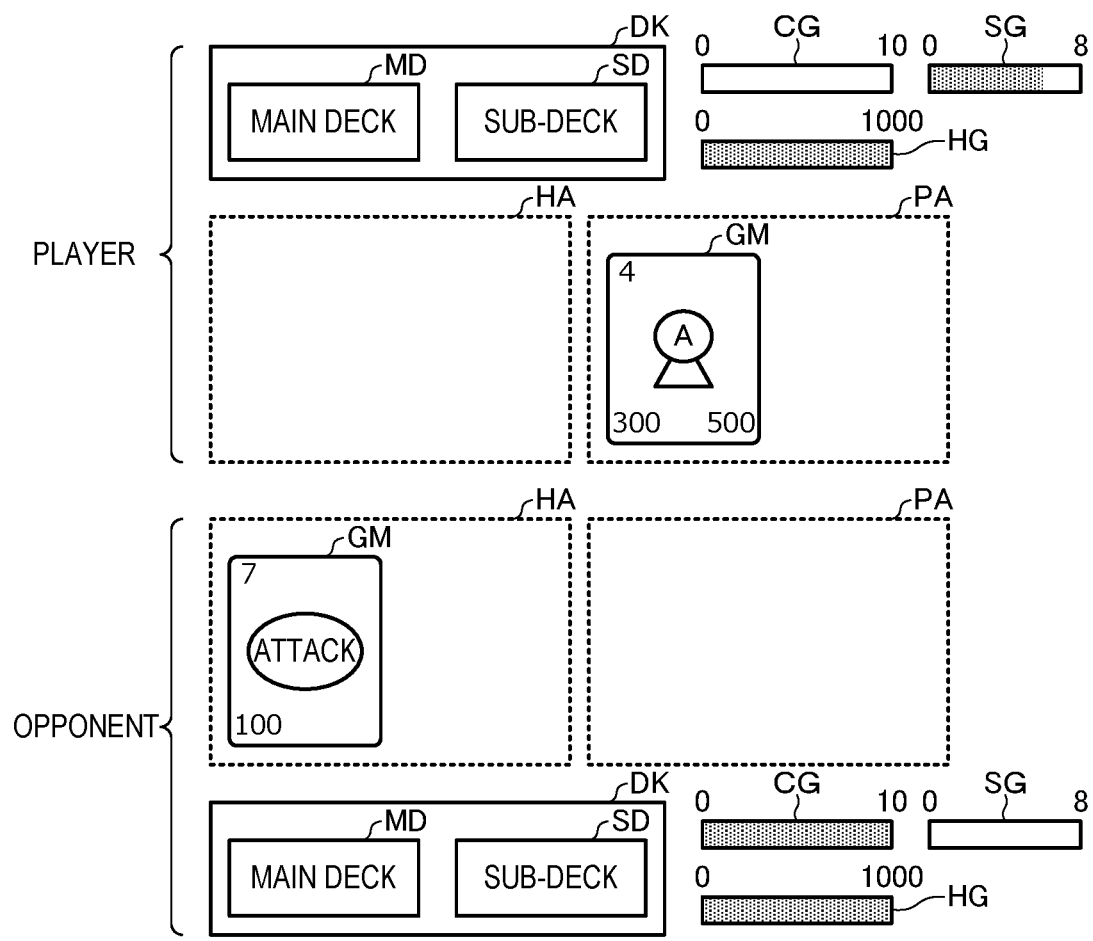
FIG. 6 is a schematic diagram for describing an outline of a battle game executed in one embodiment of the invention.

In this embodiment, by reducing the compensation parameter to 0 at the time point at which the turn (actable period) ends, the accumulated parameter is increased by the reduction amount of the compensation parameter (in other words, the remaining amount of the compensation parameter at the time point at which the turn ends) within the range of not exceeding the upper limit value. In the example illustrated in FIG. 5, the amount of the compensation parameter at time point at which the turn of the player ends is "6", and hence the compensation parameter becomes "0", and the accumulated parameter becomes "6" by increasing by "6" (see FIG. 6). The amount of the compensation parameter does not necessarily need to be reduced until the compensation parameter becomes 0, and it is possible to reduce only a predetermined amount out of the remaining amount (a part of the remaining amount) of the compensation parameter at the time point at which the turn ends. For example, the following is performed when the upper limit value of the accumulated parameter is "10" and the accumulated parameter of the player at the current time point is "5". When the compensation parameter is remaining by "9" at the time point at which the turn of the player ends, the accumulated parameter may be increased to the upper limit value "10" by reducing the remaining compensation parameter by "5". In this case, the amount "4" of the compensation parameter that is not used in the accumulation may be passed on to the next turn of the player or may be set to "0". The amount to be reduced (amount to be accumulated) out of the remaining amount of the compensation parameter at the time point at which the turn ends may be designated by the operation of the player and the like, may be specified in accordance with the game progress situation (for example, the player level and the number of wins), or may be randomly specified. The amount of the compensation parameter that is not used for the accumulation may be passed on to the next turn of the player or may be caused to be "0" also in this case. When the remaining amount of the compensation parameter is reduced to 0 and the accumulated parameter is increased by the reduction amount of the compensation parameter, the increase amount of the accumulated parameter naturally increases as the remaining amount of the compensation parameter increases. However, the invention is not limited thereto, and the increase amount of the accumulated parameter may increase as the remaining amount of the compensation parameter increases regardless of the reduction amount. For example, the accumulated parameter may be increased by "2" when the compensation parameter of which remaining amount is "2" is reduced by "2", and the accumulated parameter may be increased by "8" when the compensation parameter of which remaining amount is "4" is reduced by "2".

Figure 7:
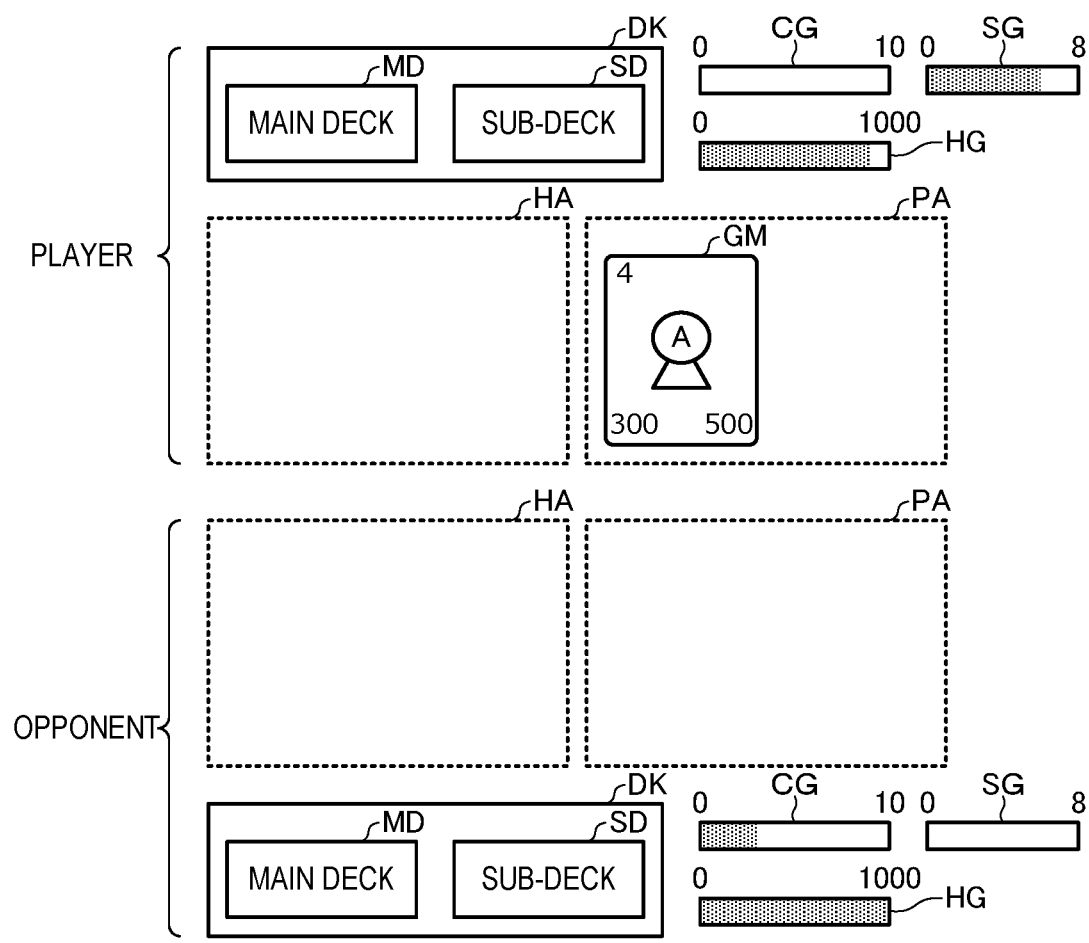
FIG. 7 is a schematic diagram for describing an outline of a battle game executed in one embodiment of the invention.

When it is the turn of the opponent, one game medium is selected from the game media included in the deck DK of the opponent as the hand. In the example illustrated in FIG. 6, the game medium GM indicating the special effect (an effect of attacking the player herein) is selected as the hand from the deck DK of the opponent and is disposed in the hand area HA of the opponent. In the game medium GM indicating the special effect, the cost (upper-left number) and the attack force (lower-left number) are set. In the game medium GM of the special effect illustrated in FIG. 6, the cost is set to "7" and the attack force is set to "100". The opponent can activate the special effect of the game medium GM in the hand (place the special effect of the game medium GM in the useable state) by consuming the compensation parameter. In the example illustrated in FIG. 7, the special effect of the game medium GM in the hand of the opponent is activated. As a result, the health point value of the player is reduced by the attack force "100" of the game medium GM, and becomes "900". The compensation parameter of the opponent is reduced by the cost "7" of the game medium GM that has activated the special effect, and becomes "3". The game medium GM that has activated the special effect is removed from the hand area HA of the opponent. No game medium is placed in the hand area HA of the opponent, and hence the turn of the opponent ends. The amount of the compensation parameter at the time point at which the turn of the opponent ends is "3" here, and hence the compensation parameter becomes "0" and the accumulated parameter becomes "3" by being increased by "3" (see FIG. 8). The game medium GM that has activated the special effect does not necessarily need to be removed and may be left in the hand area HA. In this case, it is possible to enable the special effect of the game medium GM to be activated only once during one turn.

Figure 8:
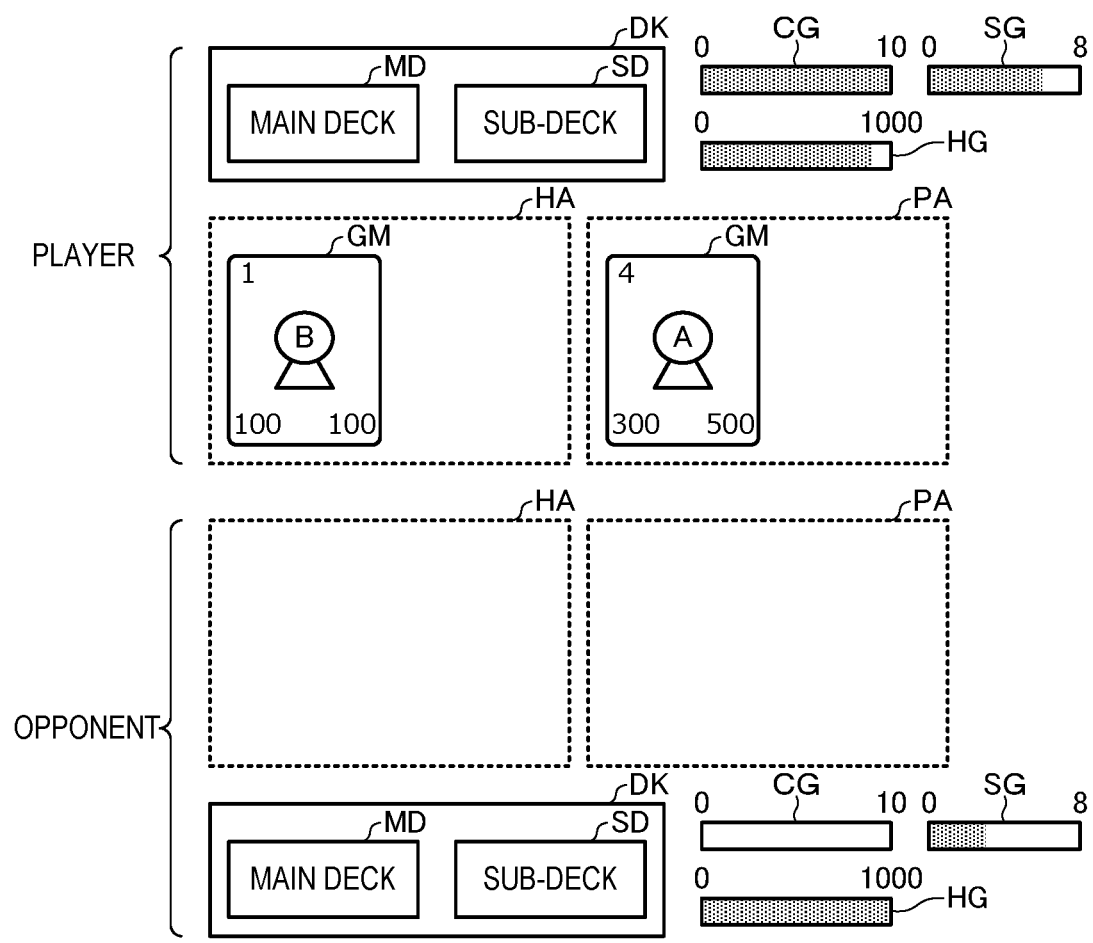
FIG. 8 is a schematic diagram for describing an outline of a battle game executed in one embodiment of the invention.
Figure 9:
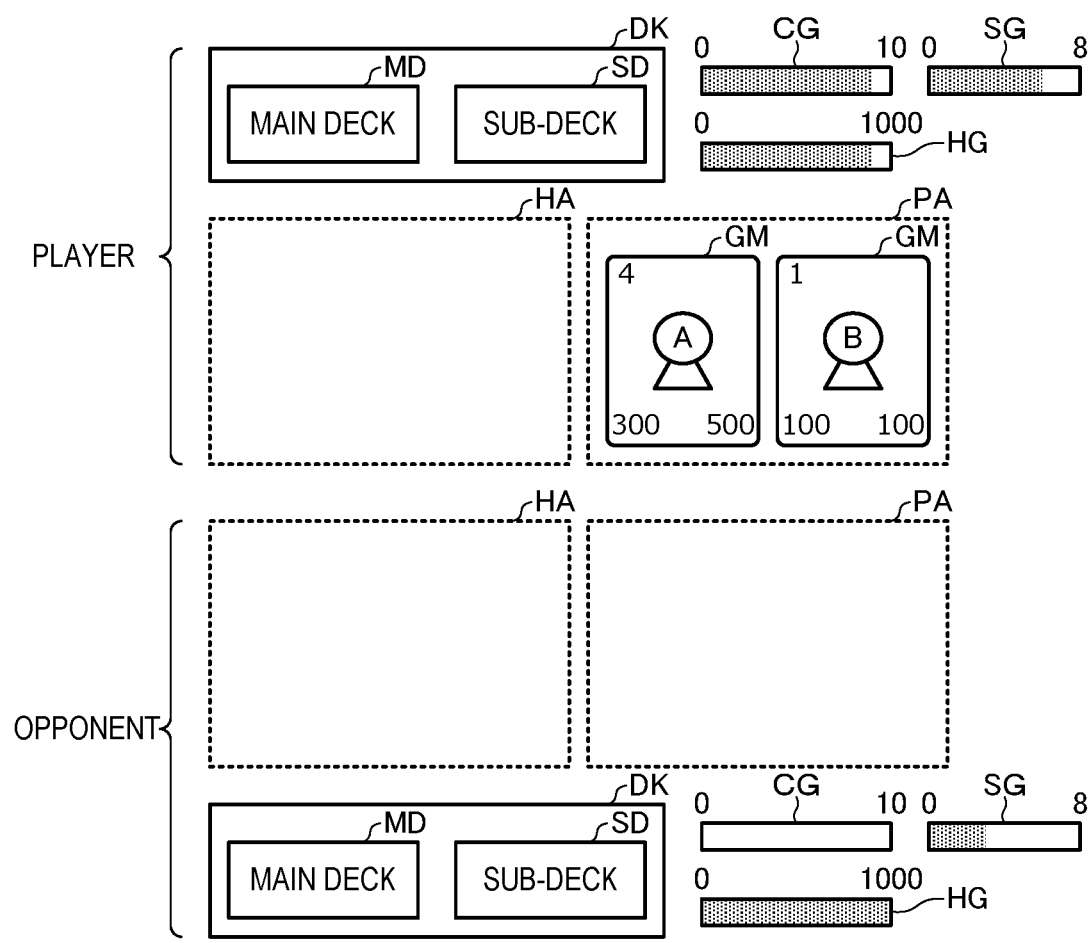
FIG. 9 is a schematic diagram for describing an outline of a battle game executed in one embodiment of the invention.

As illustrated in FIG. 8, in the next turn of the player, the compensation parameter of the player recovers (fully recovers) to a predetermined value, and the accumulated parameter of the player is "6" as described above. In the example illustrated in FIG. 8, a game medium GM indicating a character "B" is selected as the hand from the deck DK of the player. In the game medium GM of the character "B", the cost is set to "1", the attack force is set to "100", and the health point value is set to "100". In the example illustrated in FIG. 9, the player consumes the compensation parameter by the cost "1" of the game medium GM of the character "B", and places the game medium GM on the table. The game medium GM of the character "B" in the useable state cannot take action until the next turn, and the game medium GM of the character "A" is enabled to take action after one turn elapses from when the game medium GM of the character "A" is placed in the useable state. The player can cause the game medium GM of the character "A" to attack the game medium GM placed on the table of the opponent, or cause the game medium GM of the character "A" to attack the opponent. No game medium GM is placed on the table of the opponent, and hence the player causes the game medium GM of the character "A" to attack the opponent. As a result, the health point value of the opponent is reduced by the attack force "300" of the game medium GM, and becomes "700". No other game medium that can take action is placed in the layout area PA of the player, and no game medium is placed in the hand area HA of the player, and hence the player ends the turn of the player. The amount of the compensation parameter at the time point at which the turn of the player ends is "9" here, and hence the compensation parameter becomes "0", and the accumulated parameter increases to "8", which is the upper limit value (see FIG. 10).

Figure 10:
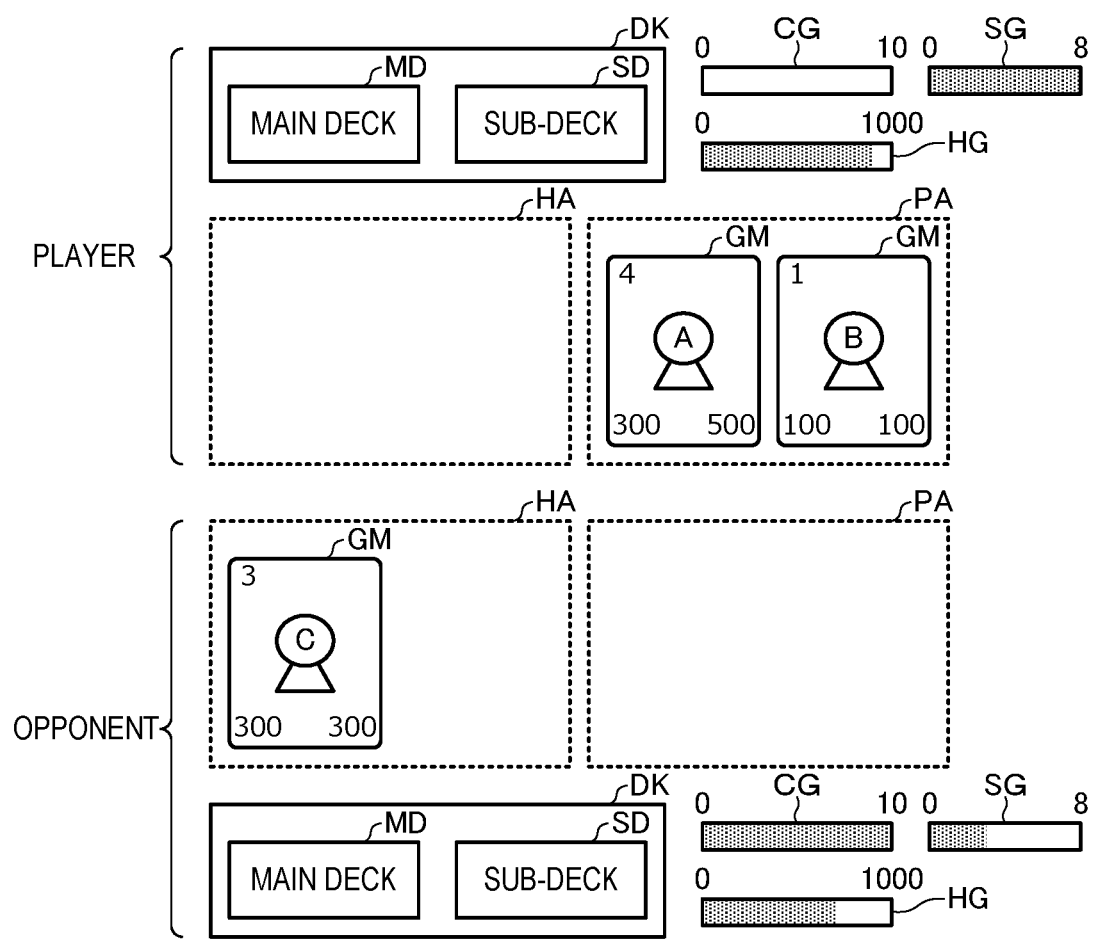
FIG. 10 is a schematic diagram for describing an outline of a battle game executed in one embodiment of the invention.
Figure 11:
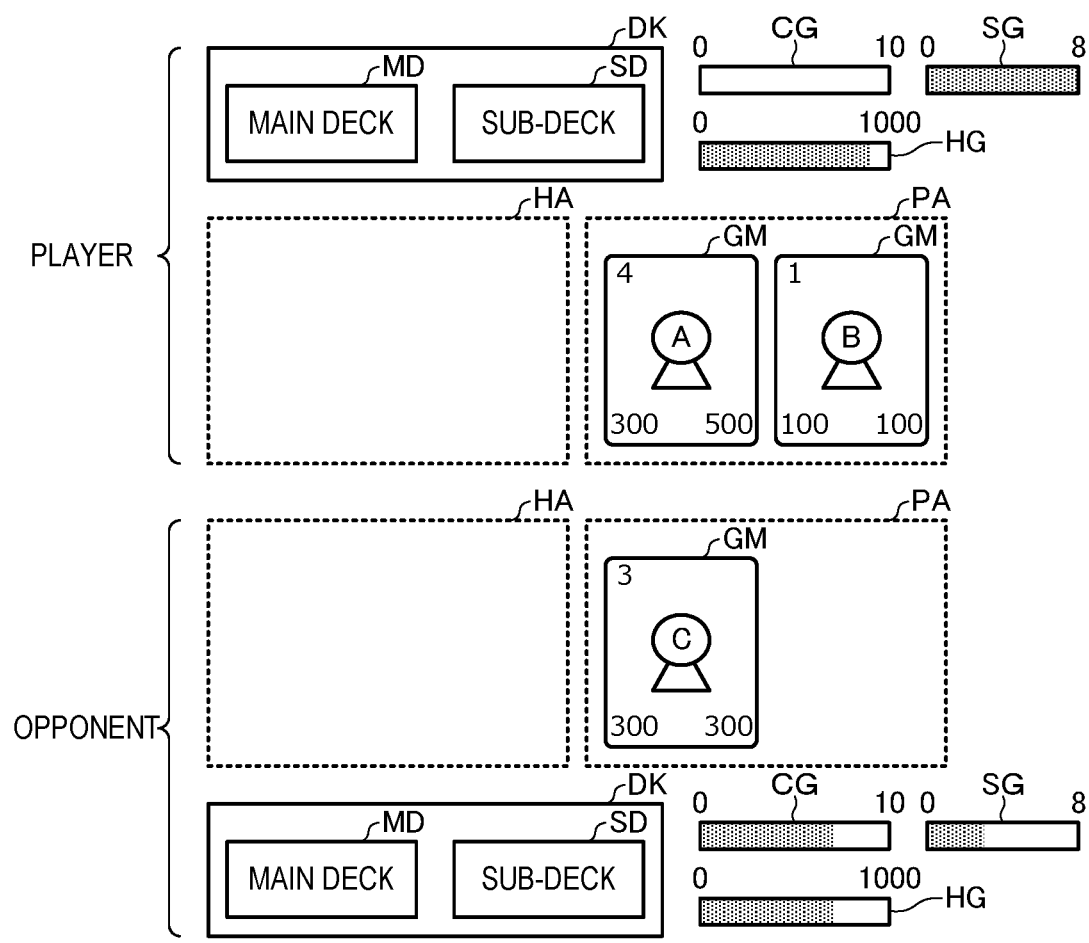
FIG. 11 is a schematic diagram for describing an outline of a battle game executed in one embodiment of the invention.

As illustrated in FIG. 10, in the next turn of the opponent, the compensation parameter of the opponent fully recovers, and the accumulated parameter of the opponent is "3" as described above. In the example illustrated in FIG. 10, the game medium GM indicating a character "C" is selected as the hand from the deck DK of the opponent. In the game medium GM of the character "C", the cost is set to "3", the attack force is set to "300", and the health point value is set to "300". In the example illustrated in FIG. 11, the opponent consumes the compensation parameter by the cost "3" of the game medium GM of the character "C", and places the game medium GM on the table. The game medium GM of the character "C" cannot take action until the next turn, and hence the turn of the opponent ends. The amount of the compensation parameter at the time point at which the turn of the opponent ends is "7" here, and hence the compensation parameter becomes "0" and the accumulated parameter increases to "8", which is the upper limit value (see FIG. 12).

Figure 12:
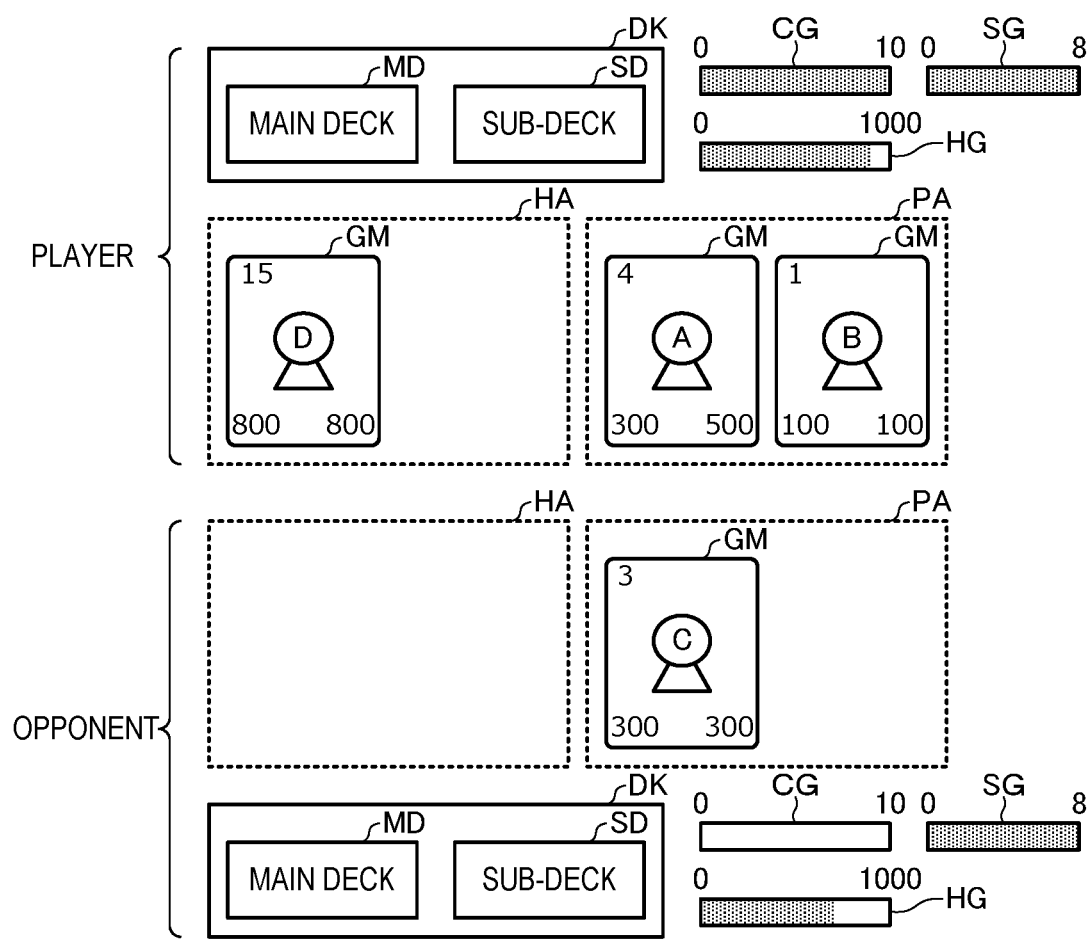
FIG. 12 is a schematic diagram for describing an outline of a battle game executed in one embodiment of the invention.
Figure 13:
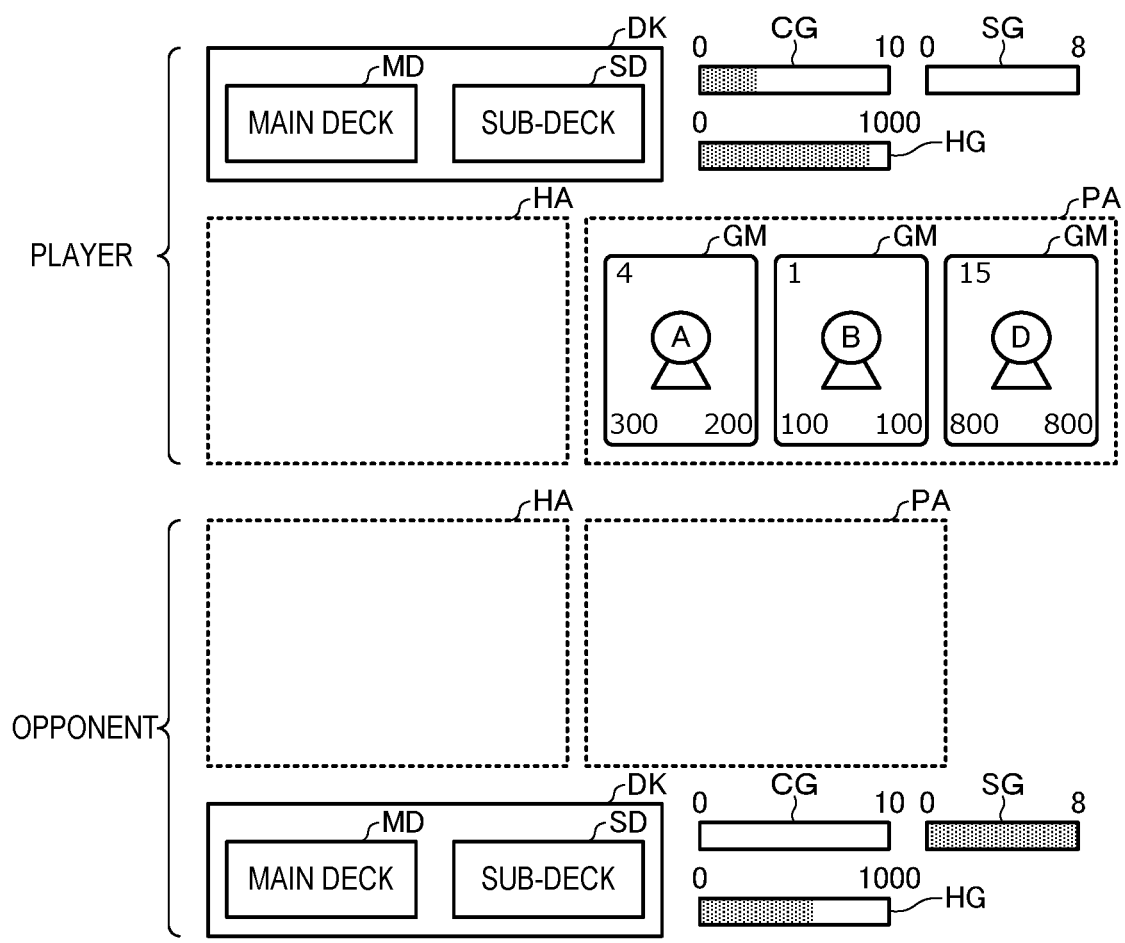
FIG. 13 is a schematic diagram for describing an outline of a battle game executed in one embodiment of the invention.

As illustrated in FIG. 12, in the next turn of the player, the compensation parameter of the player fully recovers, and the accumulated parameter of the player is "8", which is the upper limit value, as described above. The player causes the game medium GM of the character "A" placed on the table of the player to attack the game medium GM of the character "C" placed on the table of the opponent. As a result, the health point value of the game medium GM of the character "C" is reduced by the attack force "300" of the game medium GM of the character "A", and becomes "0". The health point value of the game medium GM of the character "A" is reduced by the attack force "300" of the game medium GM of the character "C", and becomes "200". The game medium GM of the character "C" of which health point value has become "0" (defeated) is removed from the layout area PA of the opponent. The player causes the game medium GM of the character "B" placed on the table of the player to attack the opponent. As a result, the health point value of the opponent is reduced by the attack force "100" of the game medium GM, and becomes "600" (see FIG. 13).

In the example illustrated in FIG. 12, the game medium GM indicating the character "D" is selected as the hand from the deck DK of the player. In the game medium GM of the character "D", the cost is set to "15", the attack force is set to "800", and the health point value is set to "800". The cost "15" of the game medium GM is larger than the predetermined value "10", and hence the game medium GM is a special game medium. The player can place the special game medium in the hand in the useable state by consuming both of the compensation parameter and the accumulated parameter. In the example illustrated in FIG. 13, the player consumes the compensation parameter and the accumulated parameter by the cost "15" of the game medium GM of the character "D" (consumes the accumulated parameter by "8" and consumes the compensation parameter by "7"), and places the game medium GM on the table.

As described above, the player and the opponent set the game medium GM selected from own deck DK as the hand to be in the useable state by consuming the compensation parameter in one turn (actable period) (places the game medium GM on the table and activates the special effect of the game medium GM), cause the game medium GM in the useable state (placed on own table) to take action (attack), and alternately repeat the above. The compensation parameter remaining at the time point at which the turn ends can be accumulated as the accumulated parameter, and the special game medium can be placed in the useable state by consuming both of the accumulated parameter and the compensation parameter. The player wins when the health point value of the opponent becomes "0" first, and the opponent wins when the health point value of the player becomes "0" first.

In this embodiment, the number of times the special game medium can be placed in the useable state by consuming the accumulated parameter during the battle game may be limited to a predetermined number of times (for example, once) (determines that the consumption condition is satisfied when the number of times does not reach a predetermined number of times), and may prevent the accumulated parameter from increasing after the number of times reaches the predetermined number of times. The special game medium may be able to be placed in the useable state by consuming the accumulated parameter by a free-selected number of times without limiting the number of times the accumulated parameter can be consumed. When the special game medium is placed in the useable state by consuming the accumulated parameter, the accumulated parameter may be caused to be zero (the accumulated parameter may be entirely consumed) regardless of the cost (consumption amount) of the special game medium. When the special game medium is placed in the useable state by consuming the compensation parameter and the accumulated parameter, the consumption of the accumulated parameter may be prioritized, or the consumption of the compensation parameter may be prioritized. The amount by which the compensation parameter is consumed and the amount by which the accumulated parameter is consumed may be designated by the player. For example, when the cost of the special game medium to be placed in the useable state is "12", the compensation parameter is "10", and the accumulated parameter is "8", the player may select whether to consume the compensation parameter by "10" and consume the accumulated parameter by "2" (prioritize the consumption of the compensation parameter), consume the compensation parameter by "4" and consume the accumulated parameter by "8" (prioritize the consumption of the accumulated parameter), or consume the compensation parameter by "6" and consume the accumulated parameter by "6", for example.

In the abovementioned example, a case where the compensation parameter is reduced to 0 at the time point at which the turn ends and the accumulated parameter is increased by the reduction amount of the compensation parameter (it is determined that the accumulation condition is satisfied when the amount of the compensation parameter is more than 0 (the compensation parameter is remaining) at the time point at which the actable period ends) has been described, but the player may be able to designate the reduction amount of the compensation parameter (the increase amount of the accumulated parameter) and whether to reduce the compensation parameter and increase the accumulated parameter (accumulate). In other words, when there is an accumulation request from the player, it may be determined that the accumulation condition is satisfied, and the compensation parameter may be reduced by an amount designated in the accumulation request and the accumulated parameter may be increased by the amount.

It may be determined whether the accumulation condition is satisfied (accumulated) depending on the game situation in the actable period (turn) of the player. For example, when the player places the game medium in the useable state in the actable period, it may be determined that the accumulation condition is satisfied. As a result, the compensation parameter of the player may be reduced, and the accumulated parameter may be increased. When the predetermined game medium is placed in the useable state in the actable period, it may be determined that the accumulation condition is satisfied. In this case, the accumulated parameter may be increased when the actable period in which the accumulation condition is satisfied ends, or the accumulated parameter may be increased when an actable period different from the actable period in which the accumulation condition is satisfied ends. It may be determined that the accumulation condition is satisfied when the number of the game media placed in the useable state is equal to or more than a predetermined number in the actable period. It may be determined that the accumulation condition is satisfied when the special effect set for the game medium is activated. The "reduction amount" by which reduction is to be performed when the accumulated parameter is increased may be set in advance for the game medium, and the accumulated parameter may be increased by performing reduction by the "reduction amount" set for the game medium when the accumulation condition is satisfied based on the game medium. In this case, the "consumption amount" and the "reduction amount" for placing the game medium in the useable state may be the same or may be different from each other. The compensation parameter may be understood to be reduced by the "reduction amount" for increasing the accumulated parameter by reducing the compensation parameter by the "consumption amount" when the game medium is placed in the useable state. It may be determined that the accumulation condition is satisfied when the player causes damage to the opponent or the game medium of the opponent (the health point value of the opponent or the health point value of the game medium of the opponent is reduced by the attack of the game medium of the player) or when the player or the game medium of the player receives damage (the health point value of the player or the health point value of the game medium of the player is reduced by the attack of the game medium of the opponent). As a result, the compensation parameter of the player may be reduced, and the accumulated parameter may be increased. It may be determined that the accumulation condition is satisfied when the player issues an accumulation request after using a predetermined item or paying money, when the player consumes the in-game currency (pays money), or when the player uses a predetermined item in the actable period. It may be determined that the accumulation condition is satisfied when the accumulated parameter is not consumed in the actable period, or when the number of times the accumulated parameter can be consumed does not reach a predetermined number of times during the battle. It may be determined whether the accumulation condition is satisfied in accordance with the player level of the player. For example, it may be determined that the accumulation condition is satisfied when the player level of the player reaches a predetermined value. It may be determined that the accumulation condition is satisfied when the player uses a predetermined item or pays money outside of the actable period (for example, before the battle game starts). It may be determined whether the accumulation condition is satisfied in accordance with the battle results and the ranking of past battles of the player, the degree of progress (for example, leading or being behind) of the battle game, and the like. When the battle game is a mini game in the main game, it may be determined whether the accumulation condition is satisfied in accordance with the degree of progress of the main game.

The amount (reduction amount) by which the compensation parameter when the accumulation condition is satisfied is reduced and the amount (increase amount) by which the accumulated parameter is increased may be the same amount or may be different amounts. For example, when the accumulation condition is satisfied and the compensation parameter is reduced by "3" (for example, when the remaining amount of the compensation parameter is "3" when the turn ends), the accumulated parameter may be increased by "1" (⅓ of the reduction amount of the compensation parameter) or the accumulated parameter may be increased by "6" (twice the amount of the reduction amount of the compensation parameter). It may be determined whether the given accumulated amount change condition is satisfied in accordance with the game situation of the actable period (turn) of the player. When the accumulated amount change condition is satisfied, the accumulated amount (the increase amount of the accumulated parameter with respect to the reduction amount of the compensation parameter) when the accumulation condition is satisfied may be changed. For example, when the player places the game medium in the useable state in the actable period, when the player causes damage to the opponent (or the game medium of the opponent), when the player (or the game medium of the player) receives damage, or when the player causes the compensation parameter of the player to be remaining, the accumulated amount when the accumulation condition is satisfied may be increased as compared to when the above does not occur. The accumulated amount when the accumulation condition is satisfied may be increased when the player uses a predetermined item or pays money in the actable period or outside of the actable period. The accumulated amount when the accumulation condition is satisfied may change in accordance with the battle results and the ranking in past battles of the player, the degree of progress of the battle game or the main game, and the like.

When the number of times the accumulated parameter can be consumed during the battle is limited to a predetermined number of times, the predetermined number of times may be specified in accordance with the game situation (whether the game medium is placed in the useable state, whether the player has received damage, whether damage is caused to the opponent, the remaining amount of the compensation parameter at the time point at which the actable period ends, the usage of a predetermined item and the payment of money, the battle result, the ranking, the player level, the degree of progress of the battle game or the main game, and the like) in the actable period or outside of the actable period of the player. For example, the predetermined number of times may be increased when the player places the game medium in the useable state, when the player causes damage to the opponent, when the player receives damage, when the player causes the compensation parameter of the player to be remaining, or when the player uses a predetermined item or pays money. The predetermined number of times may be increased as the degree of progress of the battle game or the main game increases.

The upper limit value of the accumulated parameter may be finite or infinite. When the upper limit value of the accumulated parameter is finite, the upper limit value of the accumulated parameter may be lower than, higher than, or the same as the upper limit of the compensation parameter (predetermined value). The upper limit value of the accumulated parameter may be higher than the cost (consumption amount) of the special game medium. In this case, it is possible to set the special game medium to be in the useable state without consuming the compensation parameter and by only consuming the accumulated parameter. It may be determined whether the given total amount change condition is satisfied in accordance with the game situation (whether the game medium is placed in the useable state, whether the player has received damage, whether damage is caused to the opponent, the remaining amount of the compensation parameter at the time point at which the actable period ends, the usage of a predetermined item and the payment of money, the battle result, the ranking, the player level, the degree of progress of the battle game or the main game, and the like) in the actable period or outside of the actable period of the player. When the total amount change condition is satisfied, the upper limit value of the accumulated parameter may be changed. For example, the upper limit value of the accumulated parameter may be increased when the player places the game medium in the useable state, when the player causes damage to the opponent, when the player receives damage, when the player causes the compensation parameter of the player be to remaining, or when the player uses a predetermined item or pays money. The upper limit value of the accumulated parameter may be increased as the degree of progress of the battle game or the main game increases.

It is determined whether the consumption condition is satisfied in accordance with the game situation (whether the game medium is placed in the useable state, whether the player has received damage, whether damage is caused to the opponent, the remaining amount of the compensation parameter at the time point at which the actable period ends, the usage of a predetermined item and the payment of money, the battle result, the ranking, the player level, the degree of progress of the battle game or the main game, and the like) in the actable period or outside of the actable period of the player. When the consumption condition is satisfied, the special game medium may be able to be placed in the useable state by consuming the accumulated parameter. For example, it may be determined that the consumption condition is satisfied when the player places the game medium in the useable state, when the player causes damage to the opponent, when the player receives damage, when the player causes the compensation parameter of the player to be remaining, or when the player uses a predetermined item or pays money.

According to this embodiment, the normal game medium can be placed in the useable state within the range of the upper limit (predetermined value) of the compensation parameter that automatically recovers in accordance with the elapse of time. The special game medium of which consumption amount is higher than the upper limit of the compensation parameter can be placed in the useable state by reducing the compensation parameter, increasing (accumulating) the accumulated parameter, and consuming the compensation parameter and the accumulated parameter (or only the accumulated parameter). As a result, the amusement properties of the game using the game media can be enhanced. By accumulating the compensation parameter remaining at the time point at which the actable period (turn) of the player ends as the accumulated parameter, the player can consider whether it is advantageous to place the game medium in the useable state by consuming the compensation parameter or it is advantageous to leave and accumulate the compensation parameter. As a result, the amusement properties and the strategic properties of the game can be enhanced. By limiting the number of times the special game medium can be placed in the useable state by consuming the accumulated parameter, the player can consider the advantageous timing for consuming the accumulated parameter, and the amusement properties and the strategic properties of the game can be enhanced. The amusement properties and the strategic properties of the game can be further enhanced by specifying whether accumulation is possible, changing the increase amount (accumulated amount) of the accumulated parameter or the upper limit value, specifying whether the accumulated parameter can be consumed, and changing the number of times the accumulated parameter can be consumed in accordance with the game situation of the player. A strategic play as below becomes possible by causing the accumulated parameter to be zero regardless of the consumption amount of the special game medium when the special game medium is placed in the useable state by consuming the compensation parameter and the accumulated parameter. In the strategic play, the special game medium is kept from being placed in the useable state when the difference between the amount obtained by adding the amount of the compensation parameter and the amount of the accumulated parameter together and the consumption amount of the special game is large (for example, when the amount obtained by adding is "18" and the consumption amount is "11"), and the special game medium is placed in the useable state when the difference between the amount obtained by adding the amount of the compensation parameter and the amount of the accumulated parameter together and the consumption amount of the special game is small (for example, when the amount obtained by adding is "18" and the consumption amount is "18").

When the accumulated parameter is caused to be zero when the special game medium is placed in the useable state, the following occurs. When the difference between the consumption amount of the special game medium in a state of being settable to be in the useable state (a state of being the hand and the like) and the amount obtained by adding the amount of the compensation parameter and the amount of the accumulated parameter together (hereinafter simply referred to as an "amount obtained by adding") is large (the difference is equal to or more than a predetermined value), the information on the difference may be displayed on the game screen so that the player is notified of the information. When the difference between the consumption amount of the special game medium included in the deck of the player (owned by the player) and the amount obtained by adding is large, the information on the difference may be displayed on the game screen so that the player is notified of the information. As the information on the difference, a notification indicating that the difference between the consumption amount of the corresponding special game medium and the amount obtained by adding is large may be provided, a notification indicating the value of the difference between the consumption amount of the corresponding special game medium and the amount obtained by adding may be provided, or a notification indicating both of the consumption amount of the corresponding special game medium and the amount obtained by adding may be provided (the consumption amount and the amount obtained by adding may be displayed side by side on the game screen). The special game medium according to the notification only needs to be a special game medium owned by the player, and may be a special game medium included in the hand of the player or may be a special game medium that is not included in the hand but is included in the deck of the player. When there are a plurality of corresponding special game media, the special game medium for which the information on the difference between the consumption amount and the amount obtained by adding is displayed may be switched, or the special game media may be narrowed down to the special game medium in which the difference between the consumption amount and the amount obtained by adding is the smallest or the special game medium in which the difference between the consumption amount and the amount obtained by adding is the largest and the narrowed-down special game medium may be displayed based on the operation of the player. The value of the difference may be displayed on the game screen or the consumption amount and the amount obtained by adding may be displayed side by side on the game screen regardless of the size of the difference between the consumption amount of the special game medium and the amount obtained by adding (even when the difference is less than a predetermined value).

The information on the difference between the consumption amount of the special game medium owned by the player and the amount obtained by adding may be displayed on the game screen even when the accumulated parameter is not caused to become 0 when the special game medium is placed in the useable state. The information on the difference is displayed, and hence the player can grasp how much accumulation is needed in order to place the special game medium owned by the player in the useable state. For example, the player can easily judge whether it is better to place the special game medium in the hand in the useable state, or it is better to stop the consumption of the accumulated parameter until the special game medium of which consumption amount is higher is selected as the hand because the special game medium is in the deck.

3. Processing

Figure 14:
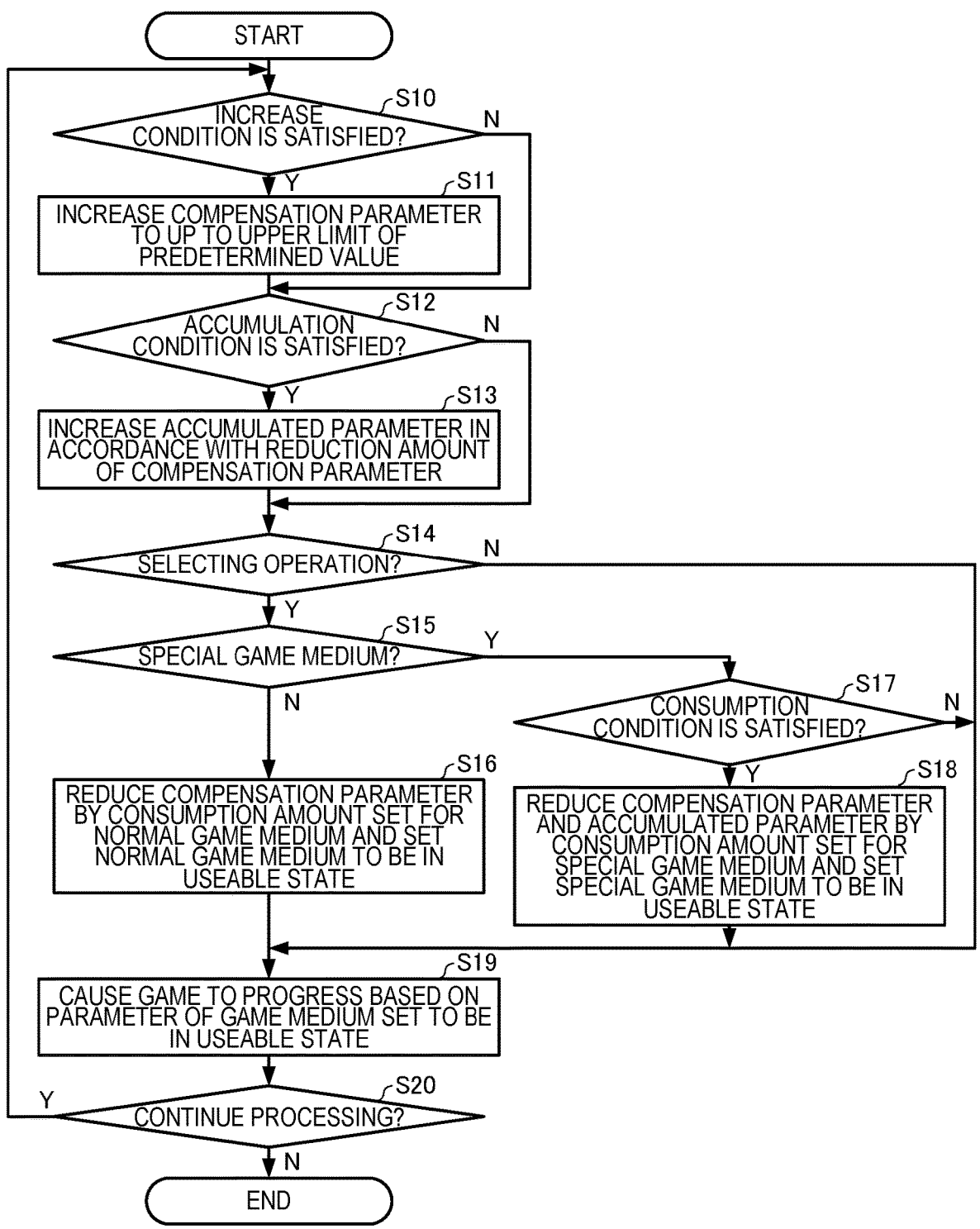
FIG. 14 is a flowchart illustrating a flow of processing of a game system according to one embodiment of the invention.

Next, one example of the processing of the game system (the terminals 10) according to one embodiment of the invention is described with reference to a flowchart in FIG. 14.

The compensation parameter management unit 114 determines whether the predetermined increase condition is satisfied (for example, a predetermined time has elapsed after the increase condition is previously satisfied) (Step S10). When the increase condition is satisfied (Y in Step S10), the compensation parameter management unit 114 increases the compensation parameter to up to an upper limit of a predetermined value (Step S11).

Next, the accumulated parameter management unit 118 determines whether the given accumulation condition is satisfied (for example, there is an accumulation request from the player or the amount of the compensation parameter is higher than 0 when the actable period of the player ends) (Step S12). When the accumulation condition is satisfied (Y in Step S12), the accumulated parameter management unit 118 reduces the compensation parameter by a given amount (for example, to 0) and increases the accumulated parameter in accordance with the reduction amount of the compensation parameter (Step S13).

Next, the useable state setting unit 110 determines whether a selecting operation for selecting the game medium to be placed in the useable state (placed on the table) from settable game media (hand) selected to be in the useable state has been performed (Step S14). When the selecting operation has been performed (Y in Step S14), the useable state setting unit 110 determines whether the selected game medium is a special game medium (Step S15). When the selected game medium is a normal game medium (N in Step S15), the useable state setting unit 110 reduces the compensation parameter by the consumption amount (cost) set for the selected game medium (normal game medium) and sets the game medium to be in the useable state (Step S16). When the selected game medium is a special game medium (Y in Step S15), the useable state setting unit 110 determines whether the given consumption condition is satisfied (for example, the number of times the accumulated parameter is consumed in a period from the start of the game to the current time point does not reach a predetermined number of times) (Step S17). When the consumption condition is satisfied (Y in Step S17), the useable state setting unit 110 reduces the compensation parameter and the accumulated parameter by the consumption amount set for the selected game medium (special game medium) (so that the value obtained by adding the reduction amount of the compensation parameter and the reduction amount of the accumulated parameter becomes equal to the consumption amount) and sets the game medium to be in the useable state (Step S18).

Next, the game progressing unit 112 controls the game to progress based on the parameter (the attack force, the health point value, and the like) of the game medium set to be in the useable state (Step S19). Next, the game progressing unit 112 determines whether to continue the game processing (Step S20). When the processing is to be continued (Y in Step S20), the processing proceeds to Step S10.

Note that this invention is not limited to the embodiments thereof described above and thus it can be implemented in many various ways. For example, any term cited with a different term having a broader meaning than or the same meaning as the term in the description or the drawings may be replaced by the different term in any place in the description or the drawings.

Some embodiments of the invention have been described in detail above, but a person skilled in the art will readily appreciate that various modifications can be made from the embodiments without materially departing from the novel teachings and effects of the invention. Accordingly, all such modifications are assumed to be included in the scope of the invention.

What is claimed is:

1. A non-transitory computer-readable information storage medium storing a program for causing a game to progress by reducing a compensation parameter by a consumption amount set for a game medium and setting the game medium to be in a useable state, the program causing a processor to:
    increase the compensation parameter to up to an upper limit of a predetermined value when a predetermined increase condition, generated playing the game, is satisfied;
    store a normal game medium in which the set consumption amount is equal to or less than the predetermined value, and a special game medium in which the set consumption amount is more than the predetermined value in a storage medium as the game medium in association with a player;
    reduce the compensation parameter by a given reduction amount and increases an accumulated parameter in accordance with the reduction amount; and
    set the special game medium to be in the useable state by reducing the compensation parameter and/or the accumulated parameter so that a sum of a reduction amount of the compensation parameter and a reduction amount of the accumulated parameter together is equal to the consumption amount set for the special game medium.

2. The information storage medium according to claim 1, wherein the program causes the processor to:
    increase the compensation parameter to up to an upper limit of a predetermined value in accordance with elapse of time.

3. The information storage medium according to claim 1, wherein the program causes the processor to:
    reduce the compensation parameter by a given reduction amount when a given accumulation condition is satisfied, and increases the accumulated parameter in accordance with the reduction amount.

4. The information storage medium according to claim 1, wherein the program causes the processor to:
    reduce the compensation parameter by a given reduction amount when a game situation in a period for accepting an operation for setting the game medium to be in the useable state and an operation for causing the game medium set to be in the useable state to act satisfies a given accumulation condition, and increases the accumulated parameter in accordance with the reduction amount.

5. The information storage medium according to claim 4, wherein the program causes the processor to:
    determine that the accumulation condition is satisfied when the compensation parameter remains in the period for accepting the operation for setting the game medium to be in the useable state and the operation for causing the game medium set to be in the useable state to act, reduces the compensation parameter by a given reduction amount, and increases the accumulated parameter in accordance with the reduction amount.

6. The information storage medium according to claim 1, wherein the program causes the processor to:
    reduce the compensation parameter by a given reduction amount at a time point at which a period for accepting an operation for setting the game medium to be in the useable state and an operation for causing the game medium set to be in the useable state to act ends, and increases the accumulated parameter in accordance with the reduction amount.

7. The information storage medium according to claim 1, wherein the program causes the processor to:
    change an upper limit value of the accumulated parameter when a given total amount change condition is satisfied.

8. The information storage medium according to claim 1, wherein the program causes the processor to:
    change an increase amount of the accumulated parameter to be increased when the compensation parameter is reduced, when a given accumulated amount change condition is satisfied.

9. The information storage medium according to claim 1, wherein the program causes the processor to:
    set the special game medium to be in the useable state by reducing the accumulated parameter when a given consumption condition is satisfied.

10. The information storage medium according to claim 1, wherein the program causes the processor to:
    cause the accumulated parameter to be zero regardless of the consumption amount set for the special game medium, when the special game medium is set to be in the useable state by reducing the accumulated parameter.

11. The information storage medium according to claim 1, the program further causing the processor to:
    display information on a difference between the consumption amount set for the special game medium owned by the player and an amount obtained by adding an amount of the compensation parameter and an amount of the accumulated parameter together on a display.

12. The information storage medium according to claim 1, wherein the program causes the processor to:
prevent the accumulated parameter from being increased after setting the special game medium to be in the useable state by reducing the accumulated parameter a predetermined number of times.

13. A game system for causing a game to progress by reducing a compensation parameter by a consumption amount set for a game medium and setting the game medium to be in a useable state, the game system comprising:
a processor programmed to:
increase the compensation parameter to up to an upper limit of a predetermined value when a predetermined increase condition, generated playing the game, is satisfied;
store a normal game medium in which the set consumption amount is equal to or less than the predetermined value, and a special game medium in which the set consumption amount is more than the predetermined value in a storage medium as the game medium in association with a player;
reduce the compensation parameter by a given reduction amount and increases an accumulated parameter in accordance with the reduction amount; and
set the special game medium to be in the useable state by reducing the compensation parameter and/or the accumulated parameter so that a sum of a reduction amount of the compensation parameter and a reduction amount of the accumulated parameter together is equal to the consumption amount set for the special game medium.

* * * * *